US012752745B2

(12) United States Patent
Kellum

(10) Patent No.: US 12,752,745 B2
(45) Date of Patent: Oct. 6, 2026

(54) COOLING SYSTEM FOR A WORK VEHICLE

(71) Applicant: DEERE & COMPANY, Moline, IL (US)

(72) Inventor: Carroll C. Kellum, Cedar Falls, IA (US)

(73) Assignee: DEERE & COMPANY, Moline, IL (US)

( * ) Notice: Subject to any disclaimer, the term of this patent is extended or adjusted under 35 U.S.C. 154(b) by 153 days.

(21) Appl. No.: 18/799,440

(22) Filed: Aug. 9, 2024

(65) Prior Publication Data

US 2026/0042427 A1 Feb. 12, 2026

(51) Int. Cl.
*B60S 1/66* (2006.01)
*B60K 11/02* (2006.01)

(52) U.S. Cl.
CPC ................. *B60S 1/66* (2013.01); *B60K 11/02* (2013.01)

(58) Field of Classification Search
None
See application file for complete search history.

(56) References Cited

U.S. PATENT DOCUMENTS

| | | | |
|---|---|---|---|
| 6,439,850 B1 | 8/2002 | McCallum et al. | |
| 7,937,938 B2 | 5/2011 | Kuipers et al. | |
| 8,162,086 B2 | 4/2012 | Robinson | |
| 8,997,906 B2 | 4/2015 | Schertz et al. | |
| 9,033,080 B2 | 5/2015 | Schertz et al. | |
| 9,133,756 B2 | 9/2015 | Soldan et al. | |
| 9,500,117 B2 | 11/2016 | Sullivan et al. | |
| 9,586,473 B2 | 3/2017 | Pfohl et al. | |
| 9,599,009 B2 | 3/2017 | Smemo et al. | |
| 9,605,583 B2 * | 3/2017 | Goering | F01P 7/04 |
| 9,622,408 B1 | 4/2017 | Miller et al. | |
| 10,031,535 B2 | 7/2018 | Rollins et al. | |
| 10,064,333 B2 * | 9/2018 | Duquesne | A01F 7/062 |
| 10,372,575 B1 | 8/2019 | North et al. | |

(Continued)

FOREIGN PATENT DOCUMENTS

| | | |
|---|---|---|
| DE | 102020212144 A1 | 5/2021 |
| EP | 2604460 B1 | 4/2016 |
| EP | 4517097 A1 | 3/2025 |

OTHER PUBLICATIONS

German Search Report issued in application No. 102025116416.9 dated Dec. 9, 2025, 08 pages.

(Continued)

*Primary Examiner* — Mahmoud S Ismail
*Assistant Examiner* — Jacob Daniel Underbakke

(57) ABSTRACT

A cooling system for a work vehicle includes a fan rotating to generate an air flow in a first direction, a map including a field having a field boundary and a headland having a headland boundary, a previous cleaning cycle and a current cleaning cycle, each of the previous cleaning cycle and the current cleaning cycle includes changing the air flow from the first direction to a second direction for a period of time and then changing the air flow from second direction to the first direction, and a controller configured to determine a distance between a current position of the work vehicle and the headland boundary, determine an elapsed time since a completion of the previous cleaning cycle, and initiate the current cleaning cycle based in part on the distance and the elapsed time.

12 Claims, 6 Drawing Sheets

(56) References Cited

U.S. PATENT DOCUMENTS

| | | | | |
|---|---|---|---|---|
| 10,499,540 | B2 | 12/2019 | North et al. | |
| 11,073,074 | B1 | 7/2021 | Kennedy et al. | |
| 11,162,507 | B2 | 11/2021 | Miller | |
| 11,668,228 | B2 | 6/2023 | Muttepawar et al. | |
| 11,698,122 | B2 | 7/2023 | Lubben | |
| 12,025,048 | B2 | 7/2024 | Billich et al. | |
| 2004/0151583 | A1 | 8/2004 | Bettencourt et al. | |
| 2009/0037058 | A1 * | 2/2009 | Senneff | A01B 79/005 701/1 |
| 2010/0326755 | A1 * | 12/2010 | Husson | B62D 25/10 180/68.1 |
| 2012/0247729 | A1 * | 10/2012 | Schertz | F28F 27/00 165/95 |
| 2013/0146377 | A1 * | 6/2013 | Adamson | B60K 11/02 180/68.1 |
| 2013/0153180 | A1 | 6/2013 | Montocchio et al. | |
| 2015/0017901 | A1 * | 1/2015 | Pfohl | E02F 9/2095 180/68.2 |
| 2016/0102597 | A1 | 4/2016 | Jurzok et al. | |
| 2016/0258339 | A1 * | 9/2016 | Goering | F01P 7/04 |
| 2019/0184811 | A1 * | 6/2019 | Ivey | B60S 1/62 |
| 2021/0054776 | A1 * | 2/2021 | Steinmetz | F01P 7/10 |
| 2022/0374020 | A1 * | 11/2022 | Tahiliani | G05D 1/661 |

OTHER PUBLICATIONS

German Search Report issued in application No. 102025116412.6 dated Dec. 9, 2025, 14 pages.

* cited by examiner

COOLING SYSTEM FOR A WORK VEHICLE

FIELD OF THE DISCLOSURE

The present disclosure relates to a cooling system of a work vehicle.

BACKGROUND

Work vehicles can include cooling fans for circulating air over a radiator during normal operation of the machine. The cooling fan and radiator may be housed in an engine compartment that includes openings for air to flow through the compartment. Typically, these openings are covered with a grill or screen to limit debris from entering the engine compartment.

SUMMARY

According to an aspect of the present disclosure, a cooling system for a work vehicle includes a fan rotating to generate an air flow in a first direction, a map including a field having a field boundary and a headland having a headland boundary, a previous cleaning cycle and a current cleaning cycle, each of the previous cleaning cycle and the current cleaning cycle includes changing the air flow from the first direction to a second direction for a period of time and then changing the air flow from second direction to the first direction, and a controller configured to determine a distance between a current position of the work vehicle and the headland boundary, determine an elapsed time since a completion of the previous cleaning cycle, and initiate the current cleaning cycle based in part on the distance and the elapsed time.

According to an aspect of the present disclosure, the controller is configured to initiate the current cleaning cycle when the work vehicle is approaching the headland boundary from outside the headland, the distance is less than or equal to a first distance threshold, and the elapsed time is more than or equal to a first time threshold.

According to an aspect of the present disclosure, the controller is configured to initiate the current cleaning cycle when the work vehicle is in the headland and approaching the headland boundary, the distance is more than or equal to a second distance threshold, and the elapsed time is more than or equal to a first time threshold.

According to an aspect of the present disclosure, the controller is configured to initiate the current cleaning cycle when the elapsed time since the previous cleaning cycle is more than or equal to a second time threshold.

According to an aspect of the present disclosure, the controller is configured to initiate the current cleaning cycle when the work vehicle is in the headland and the elapsed time is more than or equal to a second time threshold.

According to an aspect of the present disclosure, the second time threshold is longer than the first time threshold.

According to an aspect of the present disclosure, one or more of the period of time, first distance threshold, the second distance threshold, the first time threshold, and second time threshold vary based on one or more the speed of work vehicle and the distance traveled of the work vehicle.

According to an aspect of the present disclosure, one or more of the period of time, first distance threshold, the second distance threshold, the first time threshold, and second time threshold are adjustable based on operator settings.

According to an aspect of the present disclosure, the controller is configured to determine the period of time based in part on one or more of a speed of the work vehicle, the distance between the current position of the work vehicle and the headland boundary, and the elapsed time since the completion of the previous cleaning cycle.

According to an aspect of the present disclosure, the distance is based on one of a planned path between the current position of the work vehicle and the headland boundary and a guidance line between the current position of the work vehicle and the headland boundary.

According to an aspect of the present disclosure, one or more of the previous cleaning cycle and the current cleaning cycle can be initiated via a user input.

The above and other features will become apparent from the following detailed description and accompanying drawings.

BRIEF DESCRIPTION OF THE DRAWINGS

The detailed description refers to the accompanying figures.

Like reference numerals are used to indicate like elements throughout the several figures.

DETAILED DESCRIPTION

The embodiments or implementations disclosed in the above drawings and the following detailed description are not intended to be exhaustive or to limit the present disclosure to these embodiments or implementations.

Figure 1:
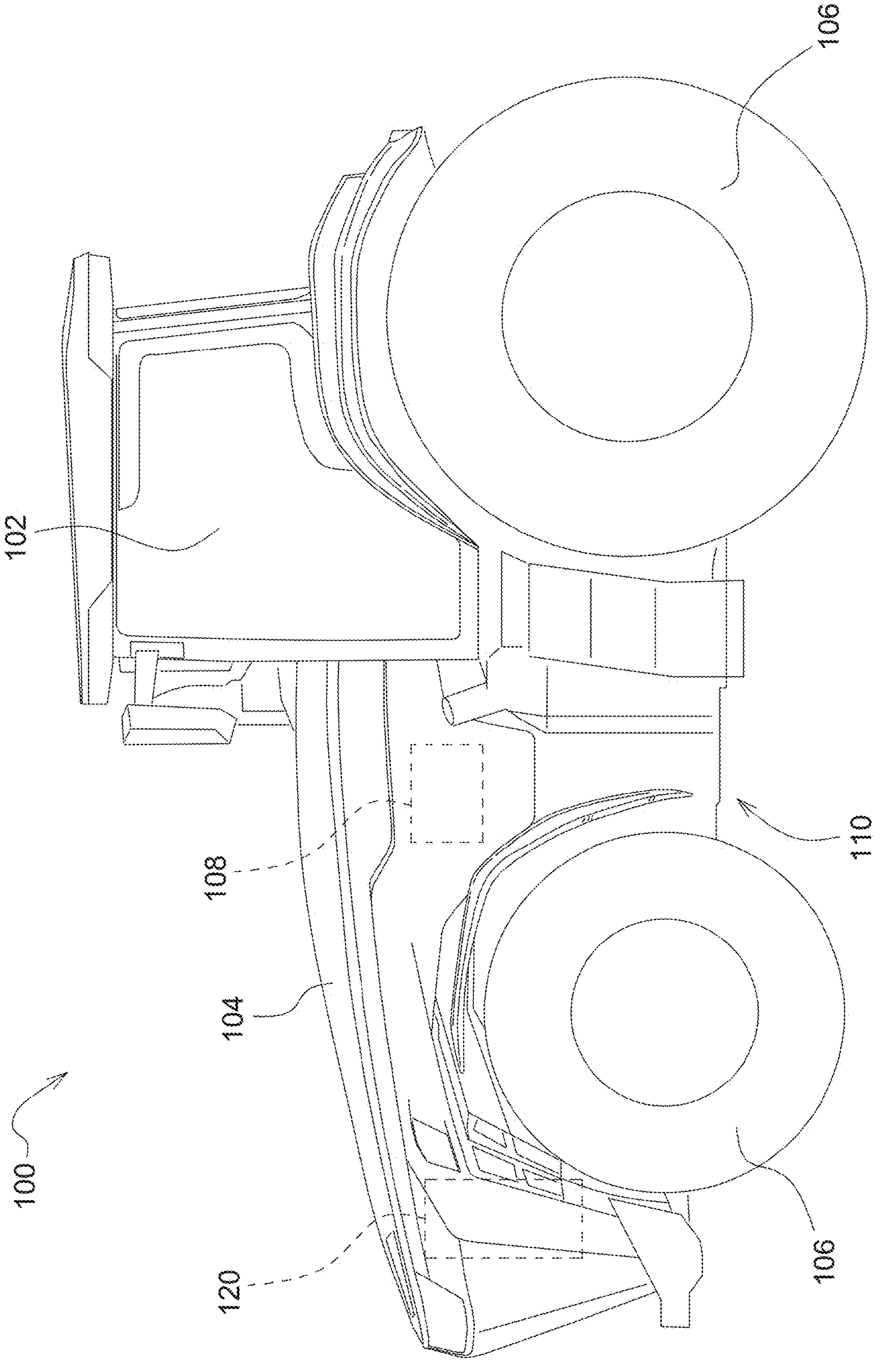
FIG. 1 is a perspective view of a work vehicle including a cooling system, according to an implementation.

With reference to FIG. 1, a work vehicle 100, for example an agricultural tractor, can include an operator station or cab 102, a hood 104, one or more ground engaging apparatus 106, for example wheels or track assemblies, and a frame or chassis 110. The work vehicle 100 can include one or more power sources 108, for example an internal combustion engine, a hybrid engine, and a battery and an electric machine. The work vehicle 100 can include an operator interface having any number and combination of electronic devices, such as an interactive display. The work vehicle 100 can have a rigid or an articulated frame 110. The work vehicle 100 can include a cooling system 120 for removing heat from various components and systems during operation. This disclosure also applies to other types of work vehicles in agriculture, construction, forestry, and road building.

Figure 2:
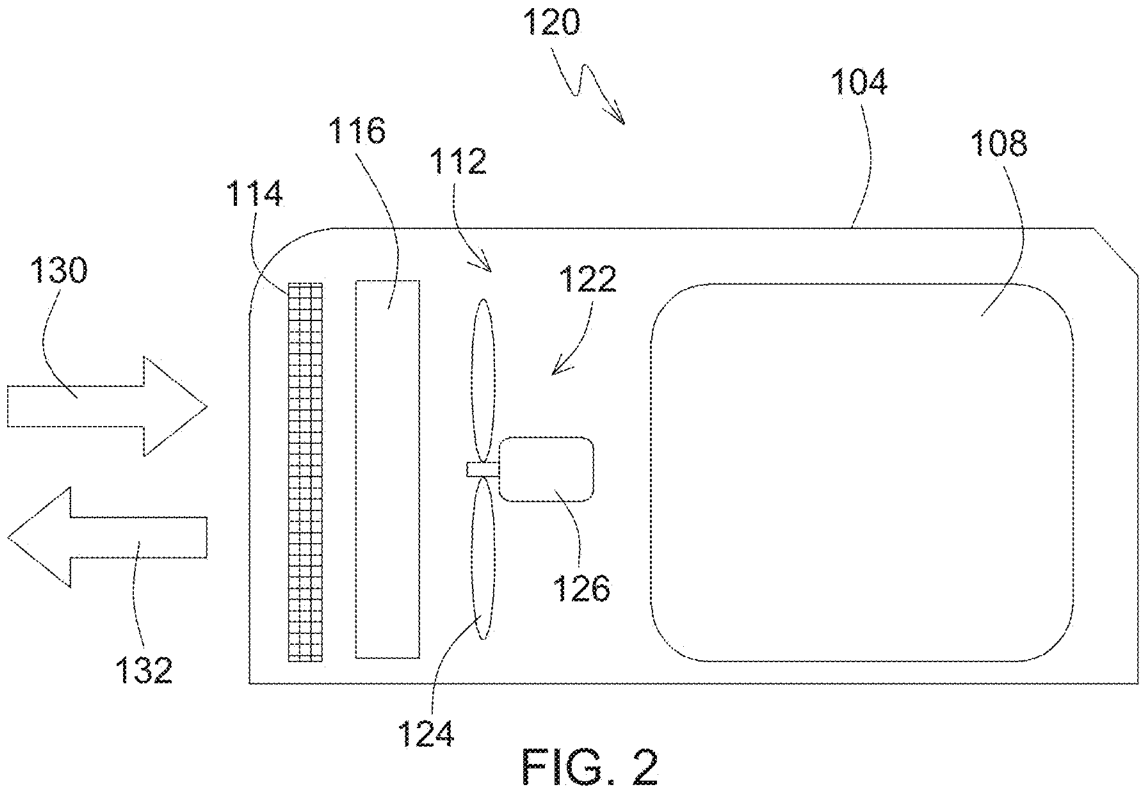
FIG. 2 is a schematic diagram of a cooling system for a work vehicle, according to an implementation.
Figure 3:
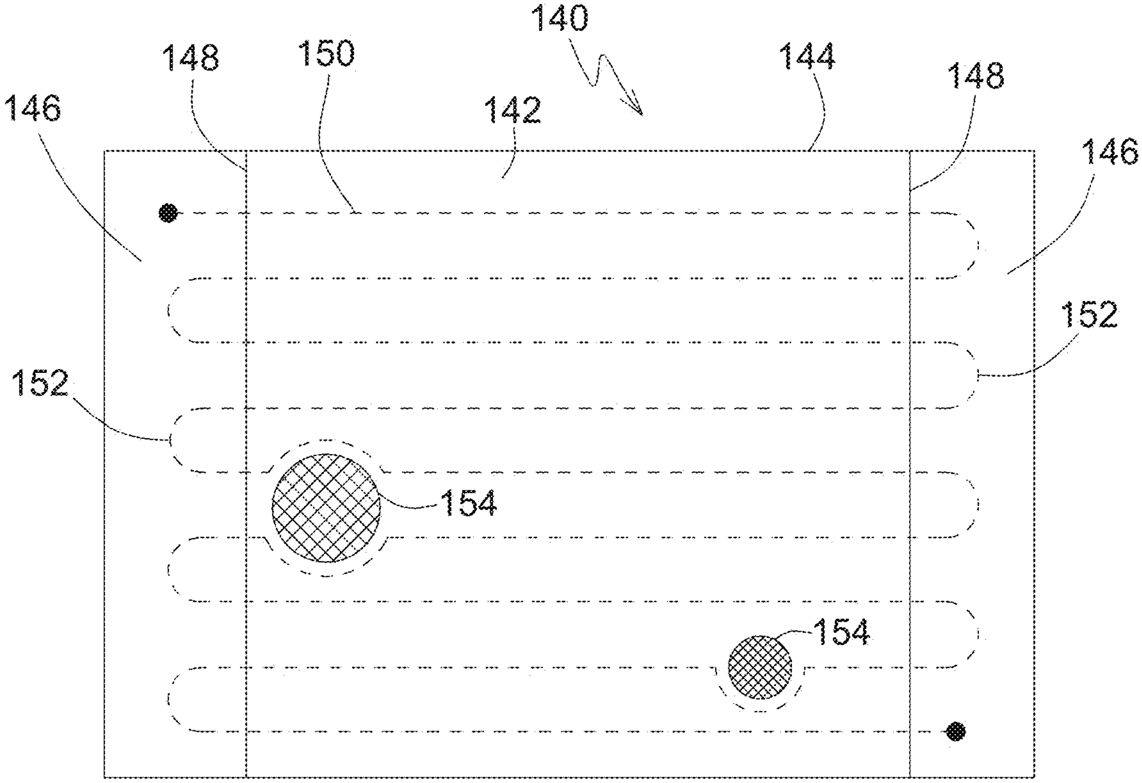
FIG. 3 is a map of a field, according to an implementation.
Figure 4:
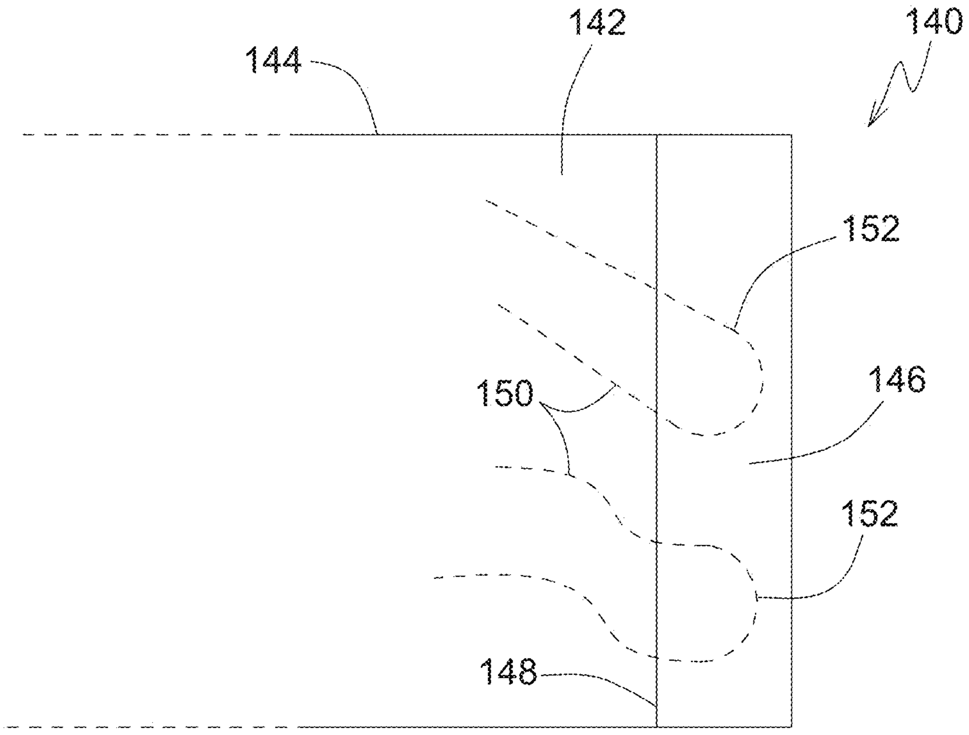
FIG. 4 is a map of a field, according to an implementation.
Figure 5:
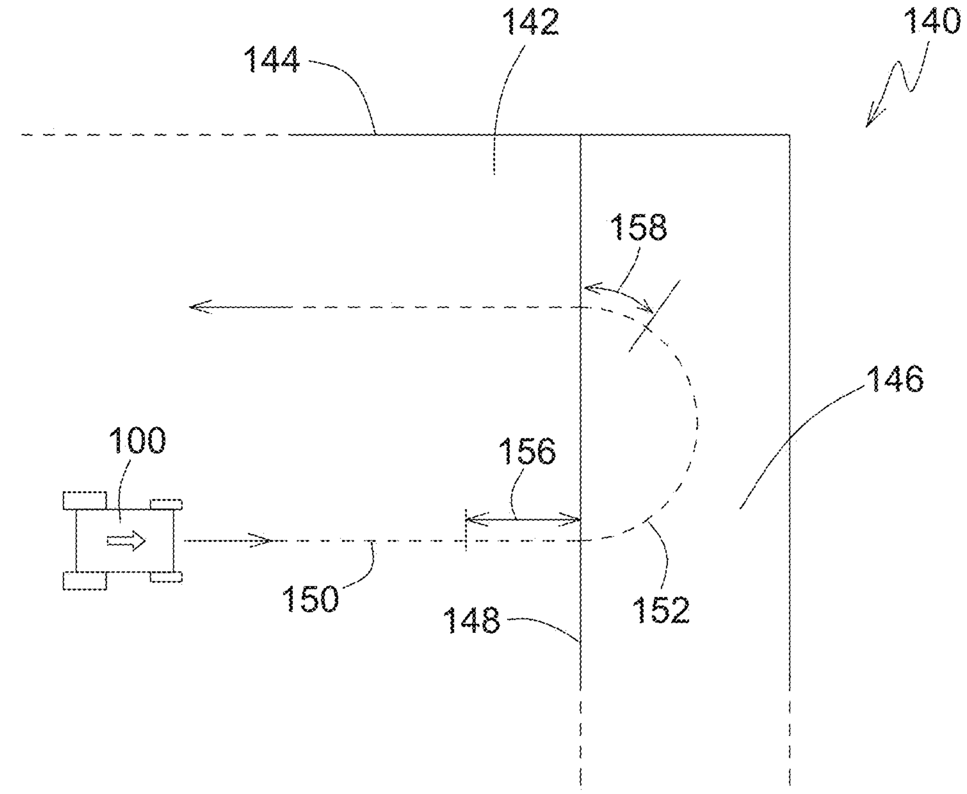
FIG. 5 is a map of a field, according to an implementation.
Figure 6:
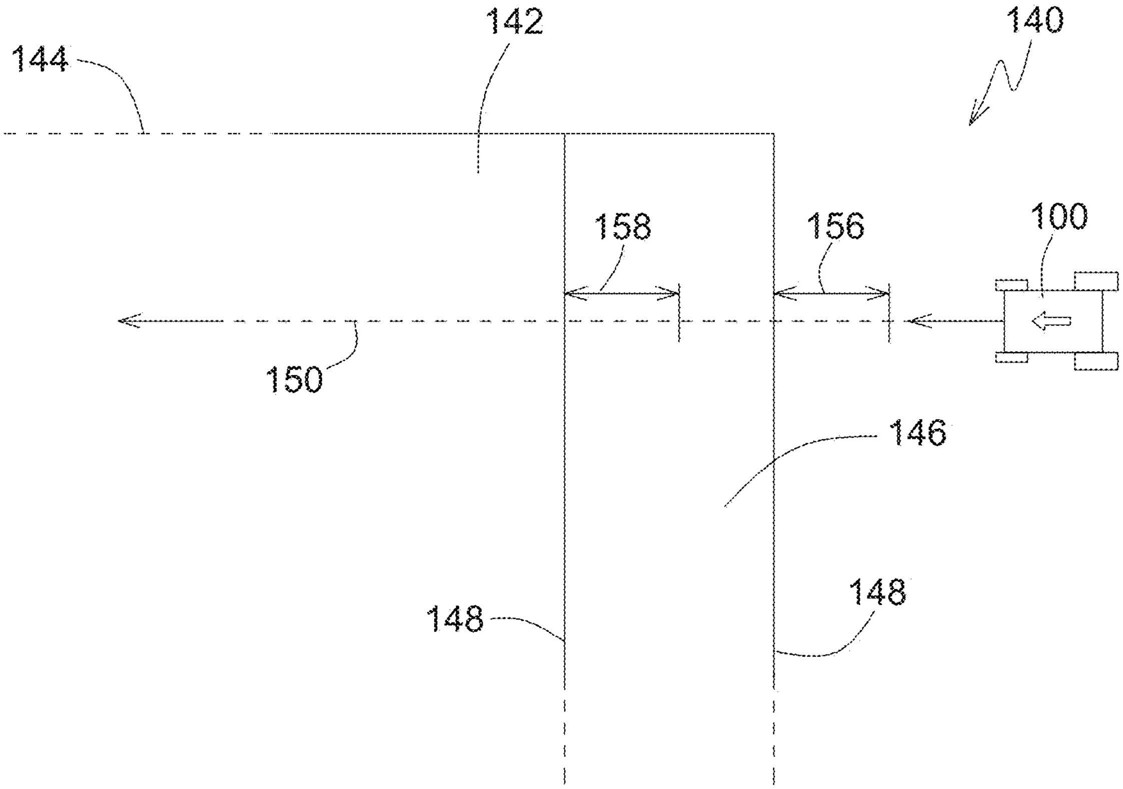
FIG. 6 is a map of a field, according to an implementation.
Figure 7:
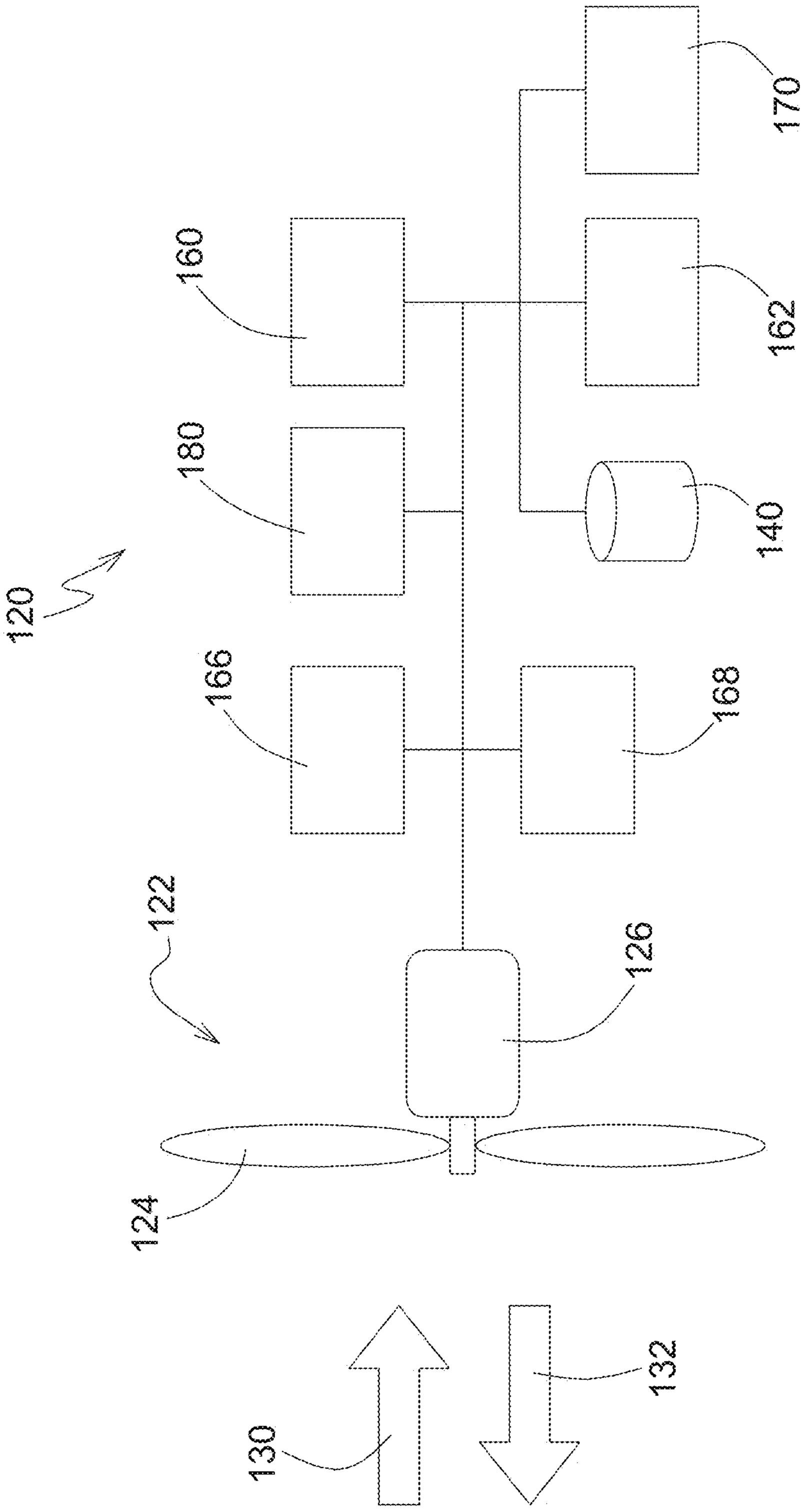
FIG. 7 is a schematic diagram of a cooling system for a work vehicle, according to an implementation.

With reference to FIG. 2, a cooling system 120 for a work vehicle 100 can include a fan 122 positioned within a compartment 112 at least partially defined by the hood 104. The fan 122 can be positioned between a grill or screen 114 and a cooling element 116, for example a radiator. The fan 122 includes one or more fan blades 124 and a fan motor 126. The fan 122 can rotate in a first direction creating an air flow in a first direction 130 from the screen 114 towards the cooling element 116. The fan 122 can rotate in a second direction creating an air flow in a second direction 132, which is opposite of the first direction, from the cooling element 116 towards the screen 114. Alternatively, or additionally, the fan 122 can rotate in one direction and the pitch or angle of the fan blades 124 can be changed to the reverse the direction of the air flow between the first direction 130 and the second direction 132.

With reference to FIGS. 3-6, an electronic map 140 of a field 142 includes a field boundary 144 around the perimeter of the field 142 and one or more headlands 146 either outside, inside, or partially outside and inside the field boundary 144. Each headland 146 has a headland boundary 148 around the perimeter of the headland 146. The map 140 can include a route 150, for example a planned path or a guidance line, for a work vehicle 100 to travel through the field 142 and perform one or more operations, for example planting, tilling, spraying, mowing, harvesting, etc. A planned path 150 can be a preselected path for unmanned or autonomous operations. A guidance line 150 can be a projected path for operations using a steering control system, for example a partially or fully automated GPS steering control system. The route 150 (e.g., the planned path or the guidance line) can include straight and curved portions and can enter or exit the headlands 146 at any angle. The route 150 can include turns 152 in the headlands 146 for the work vehicle 100 to travel into and out of the headlands 146. During the turns 152 in the headlands 146, the work vehicle 100 can be operating at a reduced load, which produces less heat energy, for example the work vehicle 100 can be traveling at a reduced speed or reduced operating demand. The route 150 can avoid or bypass one or more obstacles 154 in the field 140. Alternatively, or additionally, the field 140 can include other areas where the work vehicle 100 is operating at a reduced load, for example a downward slope or reserved area.

A first distance threshold 156 is a distance between a position or location outside of the headland 146 and the headland boundary 148 before the work vehicle 100 enters the headland 146. The first distance threshold 156 can be any distance in which at least a portion of the cleaning cycle occurs in the headland 146. The first distance threshold 156 can be a distance in which a majority or most of the cleaning cycle occurs in the headland 146. The first distance threshold 156 can be a distance in which all or substantially all the cleaning cycle occurs in the headland 146. The first distance threshold 156 can be a distance in which the work vehicle 100 begins to slow down as the work vehicle 100 approaches the headland boundary 148 from outside the headland 146. The first distance threshold 156 can vary based on the speed of the work vehicle 100, the distance traveled of the work vehicle 100, or both. The work vehicle 100 can either be inside or outside the field boundary 144 as the work vehicle 100 approaches the headland boundary 148 from outside the headland 146.

A second distance threshold 158 is a distance between a position or location in the headland 146 and the headland boundary 148 before the work vehicle exits the headland 146. The second distance threshold 158 can be any distance in which in which at least a portion of the cleaning cycle occurs in the headland 146 before the work vehicle exits the headland 146. The second distance threshold 158 can be a distance in which a majority or most of the cleaning cycle occurs in the headland 146. The second distance threshold 158 can be a distance in which all or substantially all of the cleaning cycle occurs in the headland 146. The second distance threshold 158 can be a distance in which the work vehicle 100 begins to speed up as the work vehicle 100 approaches the headland boundary 148 from the headland 146. The second distance threshold 158 can vary based on the speed of the work vehicle 100, the distance traveled of the work vehicle 100, or both.

With reference to FIGS. 1-7, an electronic control unit or controller 160 can connect to and communicate with the electronic map 140, which can be stored locally or remotely, a Global Positioning System (GPS) receiver 162, which can determine position, speed, and inclination, and one or more sensors 170 detecting or measuring various operations of the work vehicle 100 (e.g., engine sensors, transmission sensors, hydraulic sensors, electrical sensors, speed sensors, position sensors, distance sensors, inclination sensors, etc.). The controller 160 can connect to and communicate with a pneumatic or hydraulic system 166 or an electrical system 168 of the work vehicle 100 to change or reverse the direction of the air flow of the fan 122. For example, the controller 160 can connect to and communicate with a valve or actuator of the pneumatic or hydraulic system 166 to set the rotational speed and direction of the fan 122 and to change or reverse the rotational direction of the fan 122 or change the pitch or angle of the fan blades 124. Alternatively, or additionally, the controller 160 can connect to and communicate with a switch, relay, actuator, or controller of the electrical system 168 to set the rotational speed and direction of the fan 122 and to change or reverse the rotational direction of the fan 122 or change the pitch or angle of the fan blades 124.

The controller 160 can initiate or execute a previous cleaning cycle and a current cleaning cycle. Each of the previous and current cleaning cycles can include changing the air flow from the first direction 130 to a second direction 132 for a period of time and then changing the air flow from second direction 132 back to the first direction 130. The controller 160 can determine a distance between a current position of the work vehicle 100 in or outside the field 142 and the headland boundary 148. The controller 160 can determine an elapsed time since a completion of a previous cleaning cycle. The controller 160 can initiate the current cleaning cycle based in part on the distance and the elapsed time.

The period of time can be preset, preselected, or determined via the controller 160. The period of time can be adjustable. The period of time can vary based on the speed of the work vehicle 100, the distance traveled of the work vehicle 100, or both. Alternatively, or additionally, the controller 160 can determine the period of time based in part on one or more of the speed of the work vehicle 100, the distance between the current position of the work vehicle 100 in or outside the field 142 and the headland boundary 148, and the elapsed time since the completion of the previous cleaning cycle. For an example, the period of time can based on the speed and position of the work vehicle 100 relative to the headland 146 or headland boundary 148.

The controller 160 can determine the distance between the current position of the work vehicle 100 in or outside the field 142 and a headland boundary 148 based on a planned path or on a guidance line 150 between the current position of the work vehicle 100 and the headland boundary 148. The work vehicle 100 can approach the headland boundary 148 from various directions and angles. The work vehicle 100 can approach the headland boundary 148 by a direct or indirect route 150. The work vehicle 100 can approach the headland boundary 148 from inside or outside of the field 142.

Any of the previous and current cleaning cycles can be initiated via the controller 160 or via a user input on a local, remote, or mobile electronic device 180 (e.g., vehicle display, remote computer, cell phone, etc.). The controller 160 can provide an audio or visual notification, or both, via the electronic device 180. The controller 160 can provide an audio or visual notification, or both, via the electronic device 180. Any of the thresholds disclosed herein are adjustable based on operator settings input via the electronic device 180, which can be preset or adjusted via user input.

The controller 160 can determine the elapsed time since the completion of one or more previous cleaning cycles. The elapsed time can be the amount of time since the most recent previous cleaning cycle initiated via the controller 160 or the electronic device 180. The controller 160 can determine the frequency of the previous cleaning cycles and any change in the frequency.

The controller 160 can initiate the current cleaning cycle when the work vehicle 100 is in or outside the field 142 and approaching the headland boundary 148, the distance between the current position of the work vehicle 100 and the headland boundary 148 is less than or equal to the first distance threshold 156, and the elapsed time since the previous cleaning cycle is more than or equal to a first time threshold. The first distance threshold 156 can be preset, preselected, or determined via the controller 160. The first distance threshold 156 can be adjustable. The first time threshold can be an appropriate amount of time between cleaning cycles based in part on work vehicle 100 conditions, field conditions, and environmental conditions. The first time threshold can be preset, preselected, or determined via the controller 160. The first time threshold can vary based on the speed of the work vehicle 100, the distance traveled of the work vehicle 100, or both. The first time threshold can be adjustable.

The controller 160 can initiate the current cleaning cycle when the work vehicle 100 is in the headland 146 and approaching the headland boundary 148, the distance between the current position of the work vehicle 100 and the headland boundary 148 is more than or equal to a second distance threshold 158, and the elapsed time since the previous cleaning cycle is more than or equal to the first time threshold. The second distance threshold 158 can be preset, preselected, or determined via the controller 160. The second distance threshold 158 can be adjustable. The controller 160 can initiate the current cleaning cycle anywhere between the first distance threshold 156 and the second distance threshold 158. The controller 160 can initiate the current cleaning cycle anywhere after reaching or passing the first distance threshold 156 and before reaching or passing the second distance threshold 158.

The controller 160 can initiate the current cleaning cycle when the work vehicle 100 is anywhere in or outside the field 142 and the elapsed time since the previous cleaning cycle is more than or equal to a second time threshold. The controller 160 can initiate the current cleaning cycle when the work vehicle 100 is anywhere in the headland 146 of the field 142 and the elapsed time is more than or equal to the second time threshold. The controller 160 can initiate the current cleaning cycle when the elapsed time is more than or equal to the second time threshold regardless of the position or location of the work vehicle 100 either inside or outside the field boundary 144.

The second time threshold can be an upper limit for the time between cleaning cycles based in part on work vehicle 100 conditions, field conditions, and environmental conditions. The second time threshold is longer than or greater than the first time threshold. The second time threshold can be preset, preselected, or determined via the controller 160. The second time threshold can vary based on the speed of the work vehicle 100, the distance traveled of the work vehicle 100, or both. The second time threshold can be adjustable.

Figure 8:
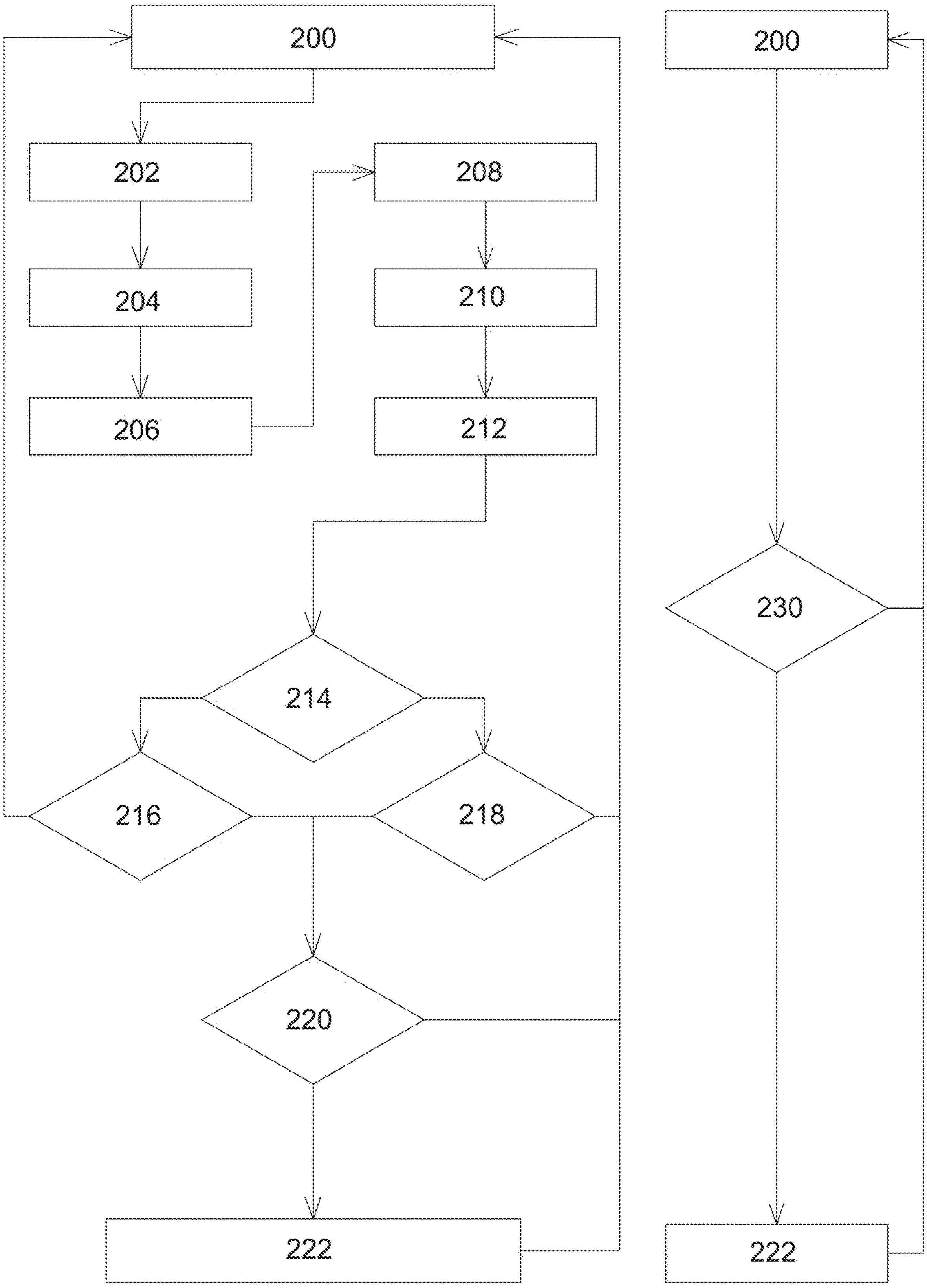
FIG. 8 is a flow diagram of a cooling system for a work vehicle, according to an implementation.

With reference to FIG. 8, a cooling system 120 for a work vehicle 100 includes one or more of the following steps, processes, or operations. At 200, the controller 160 monitors the cooling system 120. At 202, the controller 160 determines a current position of the work vehicle 100 in or outside the field 142. The controller 160 determines whether the work vehicle 100 is inside or outside of the field boundary 144 and inside or outside of the headland boundary 148. At 204, the controller 160 determines the location or position of the headland boundary 148 from the map 140. At 206, the controller 160 determines the distance between the current position of the work vehicle 100 and the headland boundary 148. At 208, the controller 160 determines the completion time of the previous cleaning cycle. At 210, the controller 160 determines a current time. At 212, the controller 160 determines an elapsed time between the completion time of the previous cleaning cycle and the current time.

At 214, the controller 160 determines whether the current position of the work vehicle 100 is in or outside the field 142 and in or outside of the headland 146. If the work vehicle 100 is outside of the headland 146, then at 216 the controller 160 determines whether the distance between the work vehicle 100 outside of the headland 146 and the headland boundary 148 is less than or equal to a first distance threshold 156. If 216 is false, then the controller 160 continues monitoring the cooling system 120 at 200. If the work vehicle 100 is in the headland 146, then at 218 the controller 160 determines whether the distance between the work vehicle 100 in the headland 146 and the headland boundary 148 is more than or equal to a second distance threshold 158. If 218 is false, then the controller 160 continues monitoring the cooling system 120 at 200. If either 216 or 218 are true, then at 220 the controller 160 determines whether the elapsed time is more than or equal to a first time threshold. If 220 is false, then at 200 the controller 160 continues monitoring the cooling system 120. If 220 is true, then at 222 the controller 160 initiates a current cleaning cycle by changing the air flow from a first direction 130 to a second direction 132 for a period of time and then changing the air flow back to the first direction 130.

In parallel with the steps, processes, or operations 200-222, the controller 160 determines whether the elapsed time is more than or equal to a second time threshold at 230. The controller 160 can determine whether the elapsed time is more than or equal to the second time threshold 230 at any time during the steps, processes, or operations 200-222. If 230 is false, then at 200 the controller 160 continues monitoring the cooling system 120. If 230 is true, then at 222 the controller 160 initiates a current cleaning cycle. After initiating the current cleaning cycle at 222, the controller 160 then continues monitoring the cooling system 120 at 200. In other implementations, one or more of these steps, processes, or operations may be omitted, repeated, re-ordered, combined, or separated and are within the scope of the present disclosure.

The electronic control unit(s) or controller(s) disclosed herein can have one or more microprocessor-based electronic control units or controllers, which perform calculations and comparisons and execute instructions, for example algorithms. The controller includes a processor, a core, volatile and non-volatile memory, digital and analog inputs, and digital and analog outputs. The controller can include non-transitory, computer readable memory, such as random-access memory (RAM), read only memory (ROM), or electrically erasable programmable read only memory (EEPROM), which include instructions for execution by the processor, for example algorithms. The controller connects to and communicates with various input and output devices including, but not limited to, switches, relays, solenoids, actuators, light emitting diodes (LED's), passive and interactive displays, radio frequency devices (RFD's), sensors, and other controllers. The controller receives communications or signals, via electrically or any suitable electromagnetic communication, from one or more devices, determines an appropriate response or action, and sends communications or signals to one or more devices. The controller can be a microprocessor, an application specific integrated circuit (ASIC), a digital processor, or a programmable logic controller, also known as a PLC or programmable controller. The controller can connect to and communicate with an electronic control system of the work vehicle through a data bus, such as a CAN bus, or the controller can be a part the electronic control system of the work vehicle.

The terminology used herein is for the purpose of describing example embodiments or implementations and is not intended to be limiting of the disclosure. As used herein, the singular forms "a," "an," and "the" are intended to include the plural forms as well, unless the context clearly indicates otherwise. It will be further understood that the any use of the terms "has," "includes," "comprises," or the like, in this specification, identifies the presence of stated features, integers, steps, operations, elements, and/or components, but does not preclude the presence or addition of one or more other features, integers, steps, operations, elements, components, and/or groups thereof.

Those having ordinary skill in the art will recognize that terms such as "above," "below," "upward," "downward," "top," "bottom," etc., are used descriptively for the figures, and do not represent limitations on the scope of the present disclosure, as defined by the appended claims. Furthermore, the teachings may be described herein in terms of functional and/or logical block components or various processing steps, which may include any number of hardware, software, and/or firmware components configured to perform the specified functions.

Terms of degree, such as "generally," "substantially," or "approximately" are understood by those having ordinary skill in the art to refer to reasonable ranges outside of a given value or orientation, for example, general tolerances or positional relationships associated with manufacturing, assembly, and use of the described embodiments or implementations.

As used herein, "e.g.," is utilized to non-exhaustively list examples and carries the same meaning as alternative illustrative phrases such as "including," "including, but not limited to," and "including without limitation." Unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

While the above describes example embodiments or implementations of the present disclosure, these descriptions should not be viewed in a restrictive or limiting sense. Rather, there are several variations and modifications which may be made without departing from the scope of the appended claims.

What is claimed is:

1. A cooling system for a work vehicle, comprising:

a fan rotating to generate an air flow in a first direction;

a map including a field having a field boundary and a headland having a headland boundary;

a previous cleaning cycle and a current cleaning cycle, each of the previous cleaning cycle and the current cleaning cycle includes changing the air flow from the first direction to a second direction for a period of time and then changing the air flow from second direction to the first direction; and a controller configured to determine a distance between a current position of the work vehicle and the headland boundary, determine an elapsed time since a completion of the previous cleaning cycle, initiate the current cleaning cycle when the work vehicle is approaching the headland boundary from outside the headland, the distance is less than or equal to a first distance threshold, in which a first portion of the current cleaning cycle occurs outside the headland as the work vehicle begins to slow down and a second portion of the current cleaning cycle occurs within the headland, and the elapsed time is more than or equal to a first time threshold, initiate the current cleaning cycle when the work vehicle is in the headland and approaching the headland boundary, the distance is more than or equal to a second distance threshold, in which a first portion of the current cleaning cycle occurs inside the headland as the work vehicle begins to speed up and a second portion of the current cleaning cycle occurs outside the headland, and the elapsed time is more than or equal to the first time threshold, and initiate the current cleaning cycle when the elapsed time since the previous cleaning cycle is more than or equal to a second time threshold, which is longer than the first time threshold, regardless of the location of the work vehicle relative to the field boundary.

2. The cooling system of claim 1, wherein of the period of time, the first distance threshold, the second distance threshold, the first time threshold, and second time threshold vary based on the speed of work vehicle and the distance traveled of the work vehicle.

3. The cooling system of claim 1, wherein one or more of the period of time, the first distance threshold, the second distance threshold, the first time threshold, and second time threshold are adjustable based on operator settings.

4. The cooling system of claim 1, wherein the controller is configured to determine the period of time based in part on a speed of the work vehicle, the distance between the current position of the work vehicle and the headland boundary, and the elapsed time since the completion of the previous cleaning cycle.

5. The cooling system of claim 1, wherein the distance is based on a guidance line between the current position of the work vehicle and the headland boundary.

6. The cooling system of claim 1, wherein one or more of the previous cleaning cycle and the current cleaning cycle can be initiated via a user input.

7. A work vehicle including a cooling system, comprising:

a fan rotating to generate an air flow in a first direction;

a map including a field having a field boundary and a headland having a headland boundary;

a previous cleaning cycle and a current cleaning cycle, each of the previous cleaning cycle and the current cleaning cycle includes changing the air flow from the first direction to a second direction for a period of time and then changing the air flow from second direction to the first direction; and a controller configured to determine a distance between a current position of the work vehicle and the headland boundary, determine an elapsed time since a completion of the previous cleaning cycle, initiate the current cleaning cycle when the work vehicle is approaching the headland boundary from outside the headland, the distance is less than or equal to a first distance threshold, in which a first portion of the current cleaning cycle occurs outside the headland as the work vehicle begins to slow down and a second portion of the current cleaning cycle occurs within the headland, and the elapsed time is more than or equal to a first time threshold, initiate the current cleaning cycle when the work vehicle is in the headland and approaching the headland boundary, the distance is more than or equal to a second distance threshold, in which a first portion of the current cleaning cycle occurs inside the headland as the work vehicle begins to speed up and a second portion of the current cleaning cycle occurs outside the headland, and the elapsed time is more than or equal to the first time threshold, and initiate the current cleaning cycle when the elapsed time since the previous cleaning cycle is more than or equal to a second time threshold, which is longer than the first time threshold, regardless of the location of the work vehicle relative to the field boundary.

8. The work vehicle of claim 7, wherein the period of time, the first distance threshold, the second distance threshold, the first time threshold, and second time threshold vary based on the speed of work vehicle and the distance traveled of the work vehicle.

9. The work vehicle of claim 7, wherein the period of time, the first distance threshold, the second distance threshold, the first time threshold, and second time threshold are adjustable based on operator settings.

10. The work vehicle of claim 7, wherein the controller is configured to determine the period of time based in part on a speed of the work vehicle, the distance between the current position of the work vehicle and the headland boundary, and the elapsed time since the completion of the previous cleaning cycle.

11. The work vehicle of claim 7, wherein the distance is based on a guidance line between the current position of the work vehicle and the headland boundary.

12. The work vehicle of claim 7, wherein the previous cleaning cycle and the current cleaning cycle can be initiated via a user input.

* * * * *